(12) United States Patent
Chen et al.

(10) Patent No.: US 7,605,317 B2
(45) Date of Patent: Oct. 20, 2009

(54) BOW-TO-STRING PRESSURE TRAINING DEVICE FOR BOWED STRING MUSIC INSTRUMENTS

(76) Inventors: Ning Chen, 5830 Southview Dr., Yorba Linda, CA (US) 92887; Wang Lai Cheung, 13651 Northlands Dr., Corona, CA (US) 92880

( * ) Notice: Subject to any disclaimer, the term of this patent is extended or adjusted under 35 U.S.C. 154(b) by 16 days.

(21) Appl. No.: 12/011,766

(22) Filed: Jan. 30, 2008

(65) Prior Publication Data

US 2009/0188369 A1 Jul. 30, 2009

(51) Int. Cl.
G10D 3/16 (2006.01)
(52) U.S. Cl. .......................................... 84/281; 84/283
(58) Field of Classification Search .................. 84/281, 84/283
See application file for complete search history.

(56) References Cited

U.S. PATENT DOCUMENTS

| | | | | |
|---|---|---|---|---|
| 2,782,670 A | * | 2/1957 | Lipski | 84/283 |
| 3,726,175 A | * | 4/1973 | Kaplan | 84/470 R |
| 3,726,176 A | * | 4/1973 | Kaplan | 84/470 R |
| 3,730,964 A | * | 5/1973 | Kaplan | 84/470 R |
| 5,038,662 A | * | 8/1991 | Ho | 84/723 |
| 5,040,447 A | * | 8/1991 | Murata et al. | 84/612 |
| 5,247,261 A | * | 9/1993 | Gershenfeld | 324/716 |
| 5,286,911 A | * | 2/1994 | Murata et al. | 84/615 |
| 5,396,025 A | * | 3/1995 | Tamura | 84/736 |
| 6,162,981 A | * | 12/2000 | Newcomer et al. | 84/485 R |
| 6,191,350 B1 | * | 2/2001 | Okulov et al. | 84/646 |
| 6,288,320 B1 | * | 9/2001 | Murakami et al. | 84/622 |
| 6,777,600 B2 | * | 8/2004 | Daring | 84/281 |
| 2003/0015087 A1 | * | 1/2003 | Haken | 84/658 |
| 2007/0084335 A1 | * | 4/2007 | Silzel | 84/723 |
| 2007/0295195 A1 | * | 12/2007 | Tamura | 84/731 |
| 2009/0064849 A1 | * | 3/2009 | Festejo | 84/485 R |
| 2009/0100992 A1 | * | 4/2009 | Elion | 84/646 |
| 2009/0188369 A1 | * | 7/2009 | Chen et al. | 84/281 |

* cited by examiner

*Primary Examiner*—Jeffrey Donels
*Assistant Examiner*—Robert W Horn

(57) ABSTRACT

It takes great effort by players of a bowed string musical instrument to manipulate proper bow-to-string pressure that directly affects the quality of the sound generated. This invention is a training device that provides bow-to-string pressure reading as feedback to players. The device consists of a rib cage, a base unit, and a liquid crystal display unit. The rib cage emulates strings and transfers bow pressure to the base unit. The main components of the base unit include a pressure sensor and microcontroller circuit board. The liquid crystal display unit displays reading sent by the microcontroller board.

8 Claims, 3 Drawing Sheets

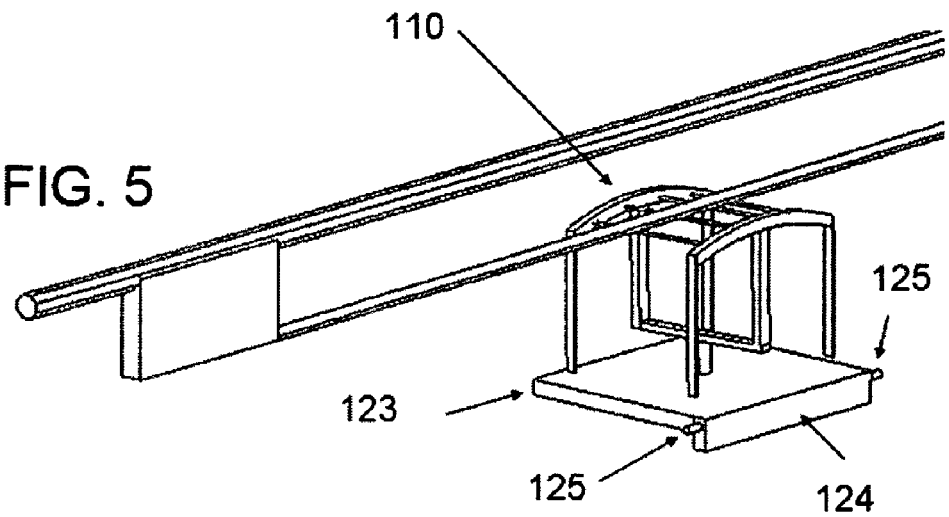
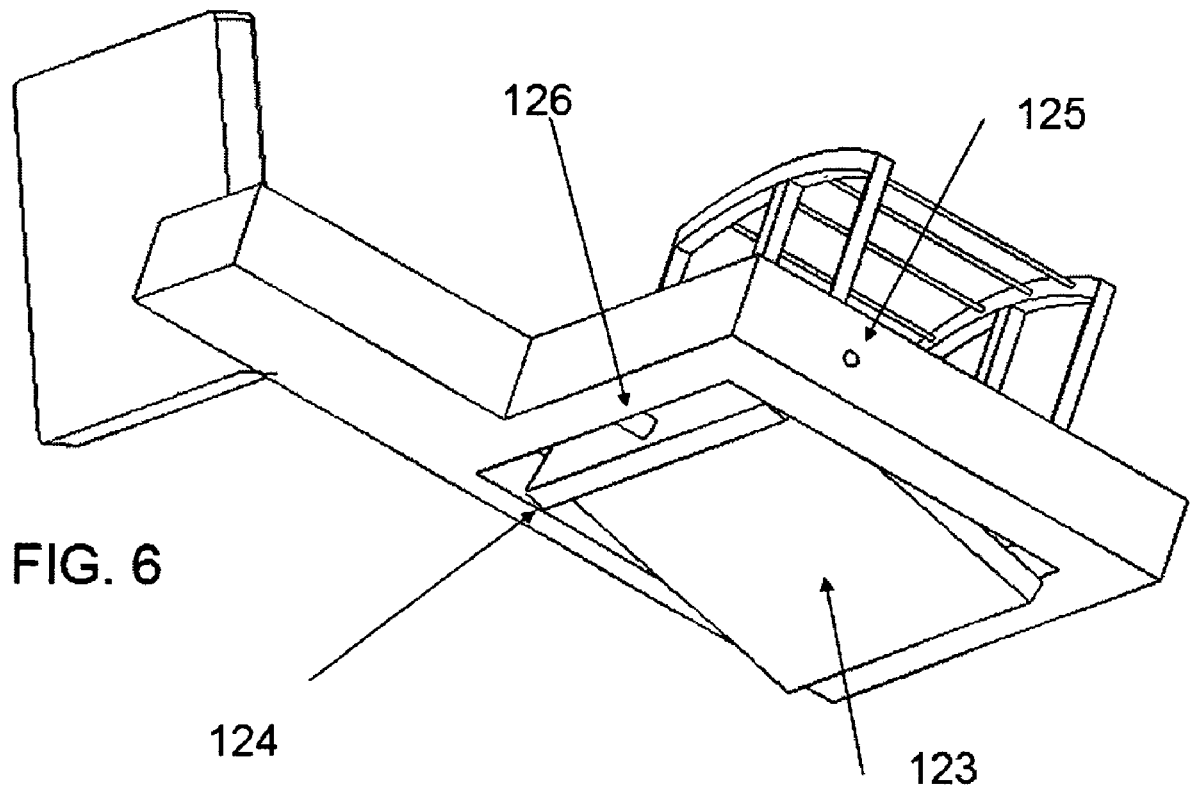

BOW-TO-STRING PRESSURE TRAINING DEVICE FOR BOWED STRING MUSIC INSTRUMENTS

CROSS-REFERENCE TO RELATED APPLICATION (not applicable)

STATEMENT REGARDING FEDERALLY SPONSORED RESEARCH OR DEVELOPMENT (not applicable)

THE NAMES OF THE PARTIES TO A JOINT RESEARCH AGREEMENT (not applicable)

INCORPORATION-BY-REFERENCE OF MATERIAL SUBMITTED ON A COMPACT DISC (not applicable)

BACKGROUND OF THE INVENTION (1) Field of the Invention

This invention relates generally to the field of bowed string musical instruments and, more particularly, to the field of bow training device that trains players to maintain a level of preferred bow-to-string pressure.

(2) Description of the Related Art

Skilled bowed string instrument players must learn how to apply bow to the strings with proper pressure in order to generate quality sound. Typically players rely on listening to the generated sound to determine the optimal bow pressure on the string. As the bow moves up and down, players also need to adjust hand and arm muscles to maintain or control a preferred level of bow-to-string pressure. Unfortunately, listening to the generated sound is the only feedback a player can get and it may take several years of practice for a beginner to train his/her ears. What is needed is a training device that provides visual readout of the bow-to-string pressure. Players then can use the pressure readout to practice the hand and arm coordination that generates preferred bow-to-string pressure. U.S. Pat. No. 6,777,600 to Daring describes a training device for bowed string instruments. The device comprises of hollow finger holder attached to the base of the bow. The player inserts his/her little finger to the finger holder such that the thumb/other fingers and the little finger form a "lever-arm" to adjust the bow-to-string pressure. Although this training device helps train player to use the little finger to form a "lever-arm" mechanism for bow-to-string pressure manipulation, the player still needs to rely on the generated sound to determine the proper bow-to-string pressure he/she should apply. It is obviously that the prior art recognized the need of manipulating the bow-to-string pressure, but it failed to identify the need of providing the bow-to-string pressure feedback to the player. Therefore, a training device that measures the bow-to-string pressure and provides this information to player in real time is needed.

SUMMARY OF THE INVENTION

The objective of having visual readout of the bow-to-string pressure is met by a small, portable device disclosed herein used to exercise and train the hand and arm coordination to exert a constant or preferred bow-to-string pressure as the bow moves up and down along the string. The device comprises a removable rib cage, a base and a microcontroller-based circuit board, a strap, and a digital liquid crystal display (LCD) panel. The base has a pressure sensor that senses pressure from the rib cage via an L-shape hinge. A strap helps position the base under the strings of the string instrument. The LCD panel displays real-time bow-to-string pressure reading. The rib cage has four bars that emulate four strings of the instrument and transfers bow pressure to the pressure sensor via the L-shape pressure plate. During practice, players move the bow on the bars of the rib cage and read real-time pressure readings. The goal of the practice is to acquire correct hand and arm coordination such that a constant or preferred bow-to-string pressure can be achieved.

BRIEF DESCRIPTION OF THE SEVERAL VIEWS OF THE DRAWING(S)

Figure 4:
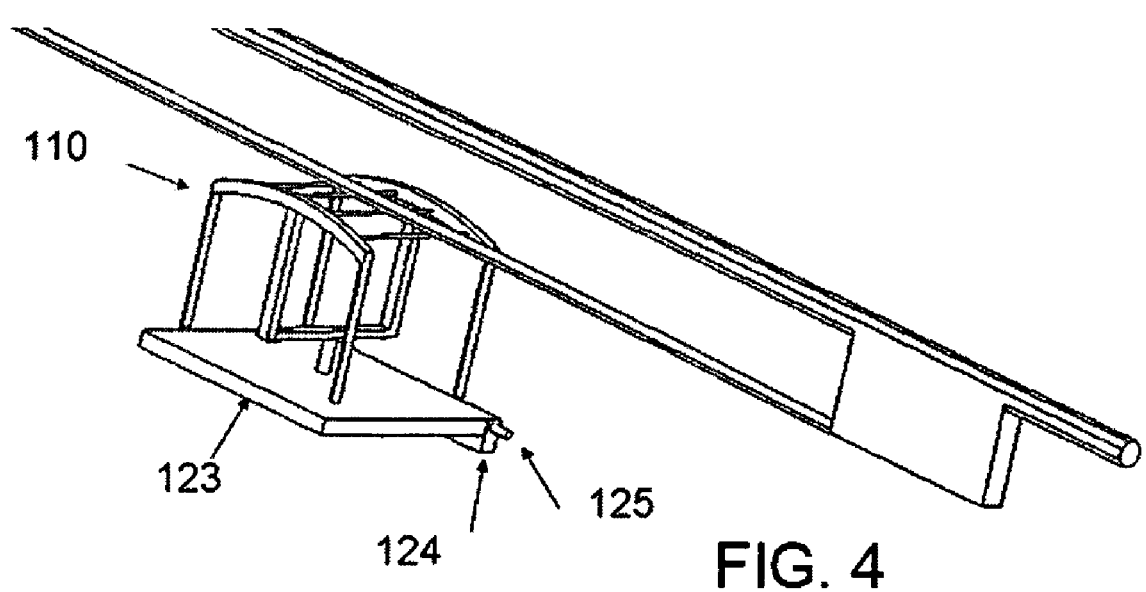

FIG. 4 reveals the L-shape pressure plate after hiding the outer shell of the base unit.

FIG. 5 is the same as FIG. 4 but viewed from another angle.

FIG. 6 shows the bottom of the base unit with the L-shape pressure plate in view.

DETAILED DESCRIPTION OF THE INVENTION

Figure 1:
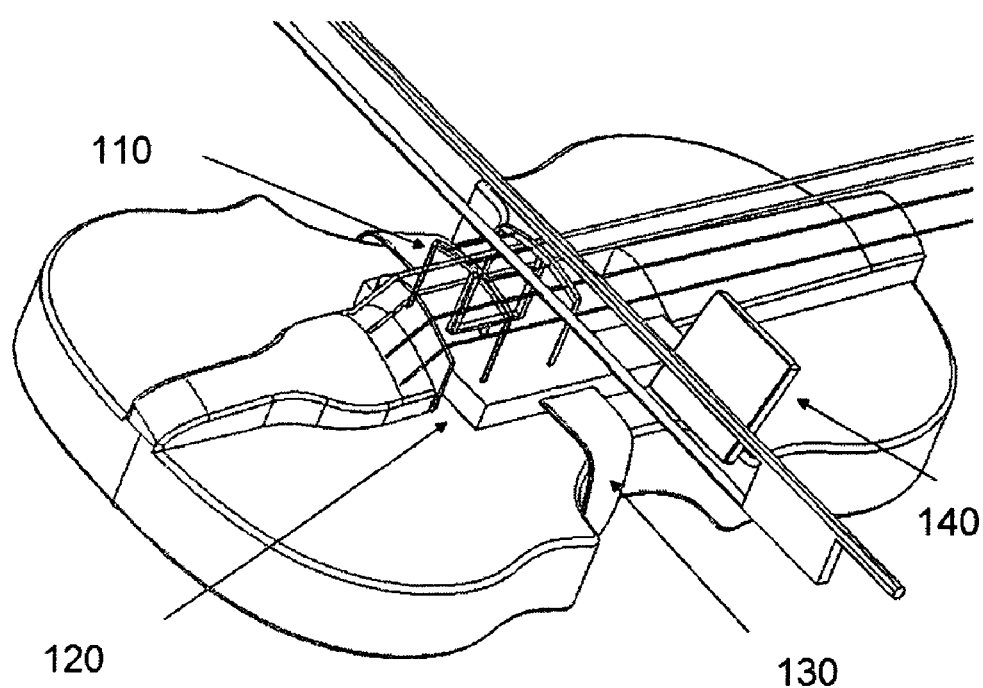
FIG. 1 is a perspective view of the bow-to-string pressure training device for string instruments
Figure 2:
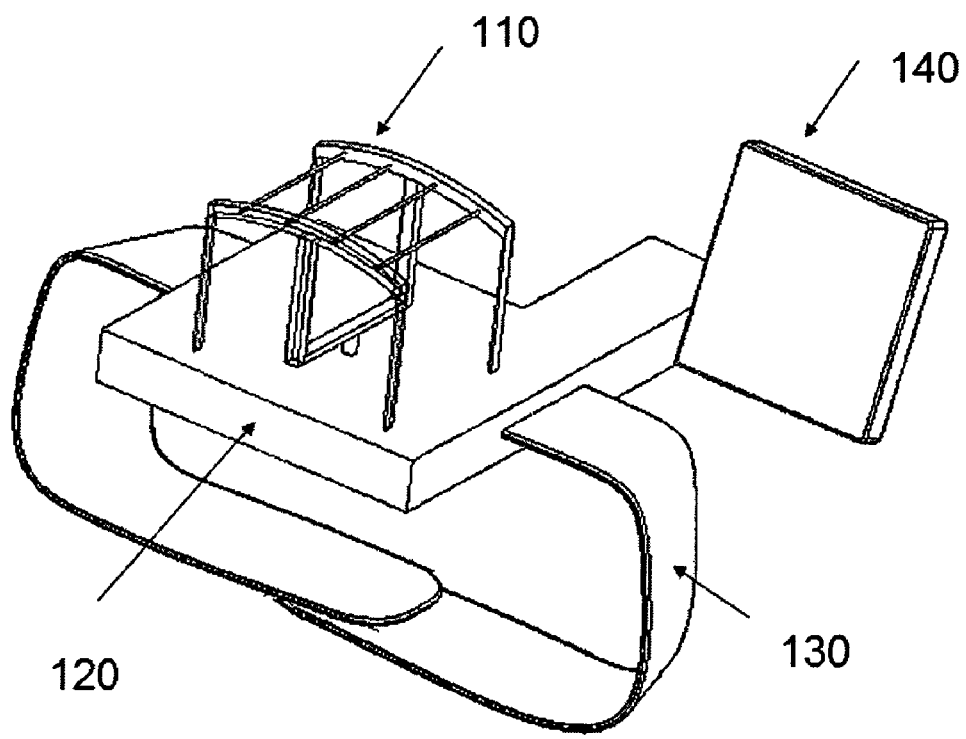
FIG. 2 is a close-up view of the device.

FIGS. 1-6 show a portable microcontroller-based device that measures the bow-to-string pressure. This training device enables a player of bowed string music instrument to learn how to maintain a desirable bow-to-string pressure. The teaching device comprises a removable rib cage 110, a base unit 120 with strap 130 and a display unit 140. FIG. 1 shows the teaching device installed on a stringed instrument (e.g., violin). FIG. 2 gives a better view of the teaching device itself after hiding the music instrument.

Figure 3:
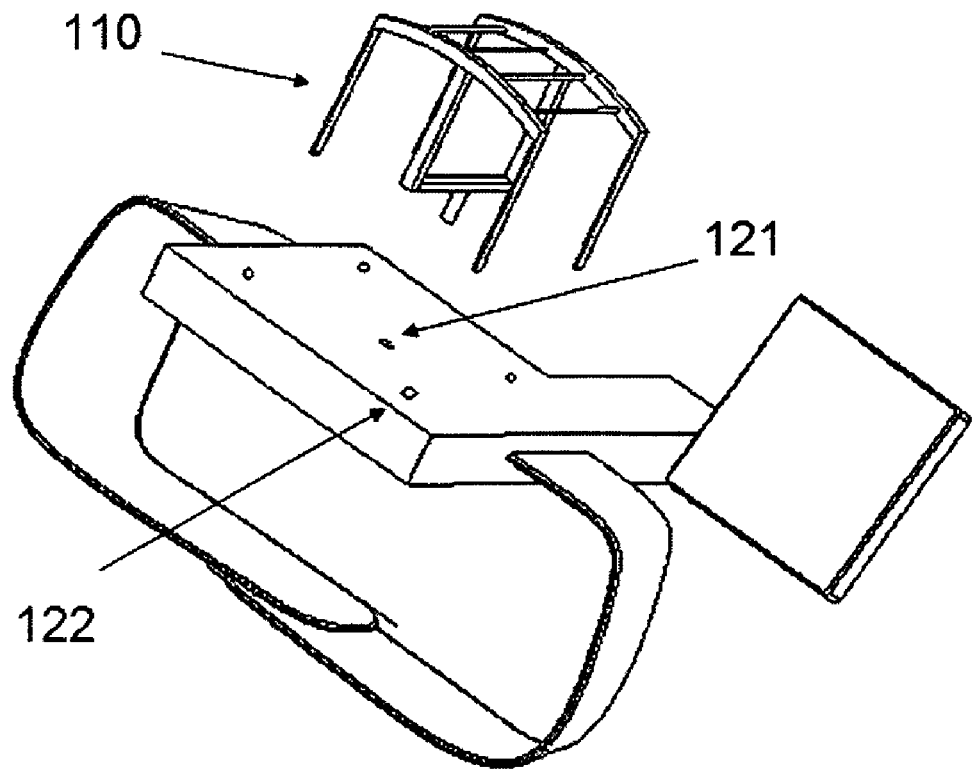
FIG. 3 shows the removable rib cage.

The removable rib cage 110 has four horizontal rigid bars that emulate the strings of a string instrument. During training, the player moves the bow on the rigid bar instead of on the instrument's string. Although the rigid bars do not vibrate and do not generate sound, they act as the strings and receive pressure from the bow. FIG. 3 demonstrates how the rib cage is inserted into the base unit. The base unit 120 contains all of the electronic parts—microcontroller, battery and circuit board (not shown) and provides structural support for the pressure plate 123, 124 and pressure sensor 126. The strap 130 is made of two pieces of Velcro® with the purpose of securing the base unit to the music instrument. The display unit 140 is made of liquid crystal display (LCD) that displays information to player in real time.

A player installs this learning device by strapping the base unit with a strap and a display unit, 120, 130 and 140, without the removable rib cage, 110. Once 120, 130 and 140 are securely strapped to the instrument, the player then inserts the removable rib cage 110 to the holes consisting of four corner holes, 121 and one center hole, 122, of the base unit 120. Although not shown, there are redundant corner holes to accommodate plurality sizes of the removable rib cages. The redundant corner holes are designed to support different sized instruments (e.g., ¼ violin) using one-size base unit by changing the size of the rib cage. To measure the bow-to-string pressure, the player places and moves the bow on the rigid bars (i.e., emulated strings). As a result of the downward force, the rib cage sinks into the base unit via one center hole and four corner holes. The downward movement of the rib cage is stopped by a pressure plate installed in the base unit. FIG. 4 shows the relative relationship among the bow, rib cage and the pressure plate 123, 124 and 125. Please note that FIG. 4 hides the outer shell of the base unit in order to reveal the pressure plate. FIG. 5 shows the rib cage and pressure plate viewed from another angle.

As shown in FIGS. 4 and 5, the pressure plate is an L-shape plate with a long side 123, a short side 124 and an axis 125. FIG. 6 is a bottom view of the base unit and shows the pressure plate. The short side of the pressure plate 124 is in contact with a pressure sensor unit 126. When the long side 123 of the pressure is pushed down by the downward movement from the removable rib cage, the pressure plate rotates along it axis 125. As a result, the short side 124 exerts pressure to the pressure sensor 126. A microcontroller-based circuit board (not shown) receives the pressure sensor signals and displays the pressure measurement to the LCD panel in real time.

What is claimed is:

1. A teaching device for bowed string instruments that provides a bow-to-string pressure reading on a display unit when a player practices bowing, the teaching device comprising:
   a base unit with an L-shape pressure plate, a pressure sensor, microcontroller-based circuit board and straps;
   a removable rib cage;
   a liquid-crystal-display unit;
   wherein the player applies bowing pressure on the rib cage, which communicates the force exerted by the bow to the pressure plate, then to the pressure sensor, and wherein the circuit board converts a sensor signal to readout on the display, and wherein the straps attach the device to the musical instrument.

2. The teaching device of claim 1 wherein the rib cage has at least one bar that emulates the strings.

3. The teaching device of claim 2 wherein the removable rib cage provides a spacing between the instrument strings and the bars so that the rib cage will not interfere with the existing strings.

4. The teaching device of claim 2 wherein the device provides a plurality sizes of the removable rib cages for different-sized string instruments (e.g., violin, viola and cello) for use on the same base unit.

5. The teaching device of claim 1 wherein the L-shape pressure plate that allows a single pressure sensor to measure the pressure exerted from all emulated strings.

6. The teaching device of claim 1 wherein the liquid-crystal-display unit is hinged to the arm of the base unit for view angle adjustment and easy stowage.

7. The teaching device of claim 1 wherein a bow-to-string pressure is measured, computed and displayed by the microcontroller and LCD based electronic system.

8. The teaching device of claim 1 wherein a Velcro® strip set is used with the straps to attach the device to the instrument.

* * * * *